United States Patent
Pecen et al.

(10) Patent No.: US 8,081,978 B2
(45) Date of Patent: Dec. 20, 2011

(54) BANDWIDTH-BASED CELL SELECTION IN A CELLULAR NETWORK

(75) Inventors: Mark Pecen, Waterloo (CA); Matthias Wandel, Waterloo (CA); Atul Asthana, Unionville (CA)

(73) Assignee: Reseach In Motion Limited, Waterloo (CA)

( * ) Notice: Subject to any disclaimer, the term of this patent is extended or adjusted under 35 U.S.C. 154(b) by 547 days.

(21) Appl. No.: 11/701,550

(22) Filed: Feb. 2, 2007

(65) Prior Publication Data

US 2008/0188228 A1 Aug. 7, 2008

(51) Int. Cl.
*H04W 4/00* (2009.01)
(52) U.S. Cl. .............. 455/435.2; 455/449; 455/453
(58) Field of Classification Search .......... 455/449, 455/525, 435.2, 435–444, 453; 370/230, 370/320
See application file for complete search history.

(56) References Cited

U.S. PATENT DOCUMENTS

| | | | |
|---|---|---|---|
| 6,167,283 A * | 12/2000 | Korpela et al. | 455/525 |
| 6,690,939 B1 * | 2/2004 | Jonsson et al. | 455/453 |
| 7,058,406 B1 | 6/2006 | Lundell et al. | |
| 2004/0116110 A1 * | 6/2004 | Amerga et al. | 455/422.1 |
| 2005/0068917 A1 * | 3/2005 | Sayeedi | 370/328 |
| 2006/0084443 A1 | 4/2006 | Yeo | |
| 2006/0140117 A1 * | 6/2006 | Aerrabotu et al. | 370/232 |
| 2006/0234755 A1 * | 10/2006 | Jonsson et al. | 455/525 |
| 2006/0234757 A1 | 10/2006 | Choi | |
| 2007/0177510 A1 * | 8/2007 | Natarajan et al. | 370/238 |
| 2007/0218910 A1 * | 9/2007 | Hill et al. | 455/445 |
| 2007/0225029 A1 * | 9/2007 | Abusch-Magder | 455/525 |
| 2007/0281685 A1 * | 12/2007 | Pan et al. | 455/432.2 |
| 2008/0125126 A1 * | 5/2008 | Fang et al. | 455/436 |
| 2008/0130495 A1 * | 6/2008 | Dos Remedios et al. | 370/230 |
| 2009/0042577 A1 * | 2/2009 | Tolli et al. | 455/436 |

FOREIGN PATENT DOCUMENTS

| | | |
|---|---|---|
| CN | 1292206 A | 4/2001 |
| EP | 0877533 A | 11/1998 |
| EP | 0929203 A2 | 7/1999 |
| WO | 99/35871 A1 | 7/1999 |
| WO | 02/32157 A | 4/2002 |
| WO | 2004/025983 A | 3/2004 |
| WO | 2004/028175 A1 | 4/2004 |
| WO | 2005/060209 A1 | 6/2005 |
| WO | 2006/129600 A1 | 12/2006 |

OTHER PUBLICATIONS

Intellectual Property Office of China, "First Office Action," issued on Mar. 24, 2011, in Chinese patent application No. 200810008983.8, 10 pages.

(Continued)

*Primary Examiner* — Jean Gelin
*Assistant Examiner* — Nathan Taylor
(74) *Attorney, Agent, or Firm* — Hanley, Flight and Zimmerman, LLC

(57) ABSTRACT

A method of cell selection in a wireless cellular network having a plurality of radio system cells involves determining a bandwidth indication for data communication through each of a serving cell and at least one neighboring cell to the serving cell. The bandwidth indication comprises an indication of the capacity for data communication through each cell. One of the cells is then selected for packet-based communication in accordance with the determined bandwidth indications.

23 Claims, 10 Drawing Sheets

OTHER PUBLICATIONS

Japanese Patent Office, "Notice of Reasons for Rejection," issued on Sep. 17, 2010, in Japanese patent application No. 2008-16951, 4 pages.
Mexican Institute of Industrial Property, "First Office Action," issued on Oct. 5, 2010, in Mexican patent application No. MX/a/2008/001552, 3 pages.
Australian Government IP Australia, "Examiner's First Report," issued on Jun. 18, 2009, in Australian patent application No. 2008200211, 2 pages.
Australian Government IP Australia, "Notice of Acceptance," issued on Sep. 21, 2010, in Australian patent application No. 2008200211, 3 pages.
European Patent Office, "Extended European Search Report," issued on Jul. 27, 2007, in European patent application No. 07101697.6-2414, 8 pages.
European Patent Office, "Office Action," issued on May 7, 2008, in European patent application No. 07101697.6-2414, 5 pages.
European Patent Office, "Office Action," issued on Oct. 19, 2009, in European patent application No. 07101697.6-2414, 3 pages.
Korean Intellectual Property Office, "Notice of Decision for Patent," issued Aug. 9, 2010, in Korean patent application No. 10-2008-0010583, 4 pages.
Korean Intellectual Property Office, "Office Action," issued Nov. 10, 2009, in Korean patent application No. 10-2008-0010583, 13 pages.
Mexican institute of Industrial Property, "Notice of Allowance," issued on Jan. 21, 2011, in Mexican patent application No. MX/a/2008/001552, 1 page.
Japanese Patent Office, "Notice of Allowance," issued on Feb. 22, 2011, in Japanese patent application No. 2008-016951, 3 page.
Canadian Intellectual Property Office, "Examination Report," issued on Aug. 9, 2011, in Canadian patent application No. 2,619,121, 3 pages.

* cited by examiner

BANDWIDTH-BASED CELL SELECTION IN A CELLULAR NETWORK

FIELD OF THE INVENTION

The invention described herein relates to a methodology for selecting radio system cells in a wireless cellular network. In particular, the invention relates to a method and apparatus for re-selecting cells for packet-based wireless communications.

BACKGROUND OF THE INVENTION

The Global System for Mobile Communication (GSM) cellular wireless network was initially designed to support circuit-switched services, such as voice telephony. Enhanced Data for Global Evolution (EDGE) is a superset of the General Packet Radio Service (GPRS), and provides the capability for packet-based user data interchange over GSM. GPRS, EDGE and other wireless data communication protocols are commonly used for the transmission of data through business and scientific software applications such as electronic mail (e-mail), calendar updates, file transfers and Internet browsing.

The GSM specification defines an algorithm for re-selecting radio system cells. According to this method, a mobile station in a Public Land Mobile Network (PLMN) measures the signal strength of the serving cell and the neighbouring cells in the PLMN, and then selects the cell having the largest Received Signal Strength Indication (RSSI). This approach to cell re-selection is sufficient for circuit-switched voice service because GSM includes an extremely agile handover algorithm that can rapidly move a conversation amongst available radio channels should the signal quality degrade or bit error probability on one channel reach a point where it is difficult to continue communication.

This approach is inefficient for packet-based GPRS/EDGE communications. GPRS/EDGE does not possess an agile handover mechanism for switching communications amongst available cells. As a result, should signal quality on the serving cell degrade during packet-based transmission such that a TDMA multiframe is not received, it is necessary to re-initiate transmission of the lost multiframe after cell re-selection. Also, GPRS/EDGE data communications usually involve transmission along multiple adjacent TDMA timeslots. However, as the probability of finding suitable multiple adjacent cells is equal to the probability of finding a single suitable cell having multiple adjacent timeslots, it is difficult to assign multiple timeslots on adjacent cells when radio link conditions on the serving cell become degraded. As a result, GPRS/EDGE data transfers are usually started and completed on a single cell, in contrast to a circuit-switched call in which it is common to change cells several times over the course of a single minute of conversation.

Attempts have been made to provide a more efficient cell selection mechanism in GSM networks. For instance, since the length of system information sent by different cells can vary significantly, a mobile station can incorrectly interpret a long break in user data transmission time, due to lengthy system information, as poor quality of service. Lundell (U.S. Pat. No. 7,058,406) describes a method for performing cell reselection in a GSM/GPRS network in which the mobile station uses length information received from a cell to estimate the period of time required to receive system information over the control channel. The mobile station then uses the time estimate as a parameter to the cell reselection algorithm.

Yeo (US 2006/0084443) describes a method for cell selection and reselection in a GSM network, in which the mobile station receives from the network a list of available cells, and then assigns a lower priority to cells that it had previously unsuccessfully selected. The mobile station also removes from the list cells whose access was previously found to have been forbidden. The mobile station then selects an appropriate cell using conventional radio-based cell selection and reselection methods, such as signal strength measurements, on the cells remaining in the list.

Choi (US 2006/0234757) describes a method for cell selection and reselection in a GSM/GPRS network, in which the mobile station determines its current speed and location, in an idle state, using GPS location information, and then calculates a predicted location from its current speed and location. The mobile station then uses the predicted location to select a best cell from amongst adjacent cells that have similar signal strength measurements.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
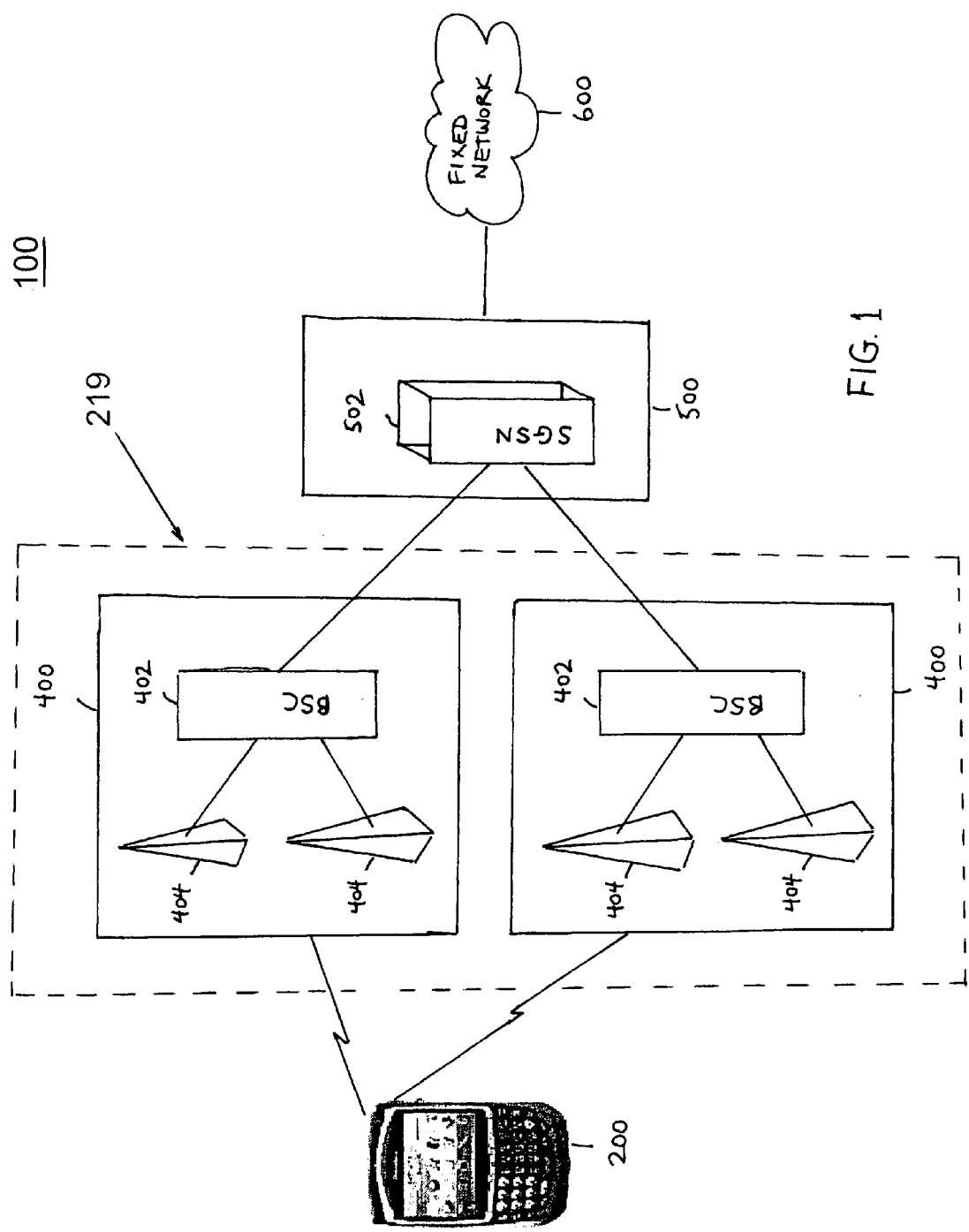
FIG. 1 is a schematic diagram depicting the GSM/GPRS/EDGE network according to the invention, including the handheld communications device, the base station subsystem and the core network.

The invention uses an assessment of network bandwidth as a parameter to the to the cell selection or re-selection algorithm.

According to a first aspect of the invention, there is provided a method of cell selection in a wireless cellular network having a plurality of radio system cells. The method involves first determining a bandwidth indication for data communication through each of a serving cell and at least one neighbouring cell to the serving cell. Each bandwidth indication comprises an indication of the capacity for data communication through each cell. Then one of the cells is selected for packet-based communication in accordance with the determined bandwidth indications.

According to a second aspect of the invention, there is provided a mobile station configured for communication within a wireless cellular network having a plurality of radio system cells. The mobile station comprises bandwidth determining means, and cell selecting means in communication with the bandwidth determining means. The bandwidth determining means is configured to determine a bandwidth indication for data communication through each of a serving cell and at least one neighbouring cell to the serving cell. Each bandwidth indication comprises an indication of a capacity for data communication through each cell. The cell selecting means is configured to select one of the cells for packet-based communication in accordance with the determined bandwidth indications.

According to a third aspect of the invention, there is provided a tangible, non-transitory computer-readable medium that carries processing instructions for a mobile station which operates within a wireless cellular network having a plurality of radio system cells. The processing instructions when, executed by computer processing means of the mobile station, causes the mobile station to determine a bandwidth indication for data communication through each of a serving cell and at least one neighbouring cell to the serving cell. Each bandwidth indication comprises an indication of the capacity of each cell for data communication. The processing instructions also cause the mobile station to select one of the cells for packet-based communication in accordance with the determined bandwidth indications.

According to a fourth aspect of the invention, there is provided a base station subsystem for facilitating communication with a mobile station within a wireless cellular network having a plurality of radio system cells. The base station subsystem comprises a radio transceiver configured to provide a wireless link with the mobile station, a network interface configured to interface the base station subsystem with a core network of the cellular network, and a network capacity analyzer coupled to the radio transceiver and the network interface. The network capacity analyzer is configured to determine for each cell an indication of a capacity of a wireless link between the mobile station and the base station subsystem.

In a preferred implementation of the invention, the bandwidth indications comprise signal strength measurements and the capacity indications for each cell, and the selecting step involves choosing the cell based on the capacity indications and the signal strength measurements. Preferably, each bandwidth indication comprises the product of the capacity indication and the signal strength measurement for the associated cell, and the cell that is chosen has the maximum calculated product.

Preferably the capacity indication comprises, for each cell, the capacity of the wireless link between the mobile station and the base station. The capacity indication may also comprise the capacity of a backhaul and a core network associated with each cell. Preferably, the capacity indication comprises, for each said cell, the product of the wireless link capacity, the backhaul capacity and the core network capacity.

According to a fifth aspect of the invention, there is provided a method of directed cell selection in a wireless cellular network having a plurality of radio system cells. The method involves first determining an indication of the capacity for data communication through each of a plurality of neighbouring radio system cells. Then, the capacity indications for each neighbouring cell are transmitted over each of the neighbouring radio system cells. A mobile station camped on one of the neighbouring cells is configured to receive the transmitted capacity indications and to select one of the neighbouring cells for packet-based communication in accordance with the received capacity indications.

FIG. 1 is a schematic view of a mobile communications network, denoted generally as 100, in accordance with the invention. The mobile communications network 100 is shown in communication with a fixed network 600, and comprises at least one wireless handheld communications device 200, a wireless cellular network 219 having a plurality of base station subsystems (BSSs) 400, and a core network 500. Preferably, the communications network 100 is configured as a GSM network. However, the invention is not limited to GSM networks. For example, the BSSs 400s in the wireless cellular network 219 may be of the same radio access technology (RAT) type such as GSM only or Code Division Multiple Access (CDMA) only, or may be a mixture of different RATs such as any combination of GSM, Universal Mobile Telecommunications System (UMTS), CDMA, Time Division Multiple Access (TDMA), Wireless Local Area Network (WLAN), and any other RATs.

The handheld communications devices 200 communicate with the BSSs 400 in the wireless cellular network 219. The BSSs 400 provide a bridge between the wireless cellular network 219 and the core network 500, and communicate with the core network 500 via a wired or optical link.

The core network 500 facilitates packet-based communication between the handheld communications devices 200 and the fixed network 600. Preferably, the core network 500 implements GPRS/EDGE communications protocols, and includes a Serving GPRS Support Node (SGSN) 502 that interfaces with the fixed network 600. Further, preferably the BSSs 400 connect to the SGSN 502 of the GPRS core network 500 via a Gb Frame Relay interface.

The core network 500 communicates with the fixed network 600 via a wired or optical link, and acts as switching node to the fixed network 600. Typically, the fixed network 600 comprises a Public Switched Telephone Network (PSTN) or an Integrated Services Digital Network (ISDN).

Figure 2:
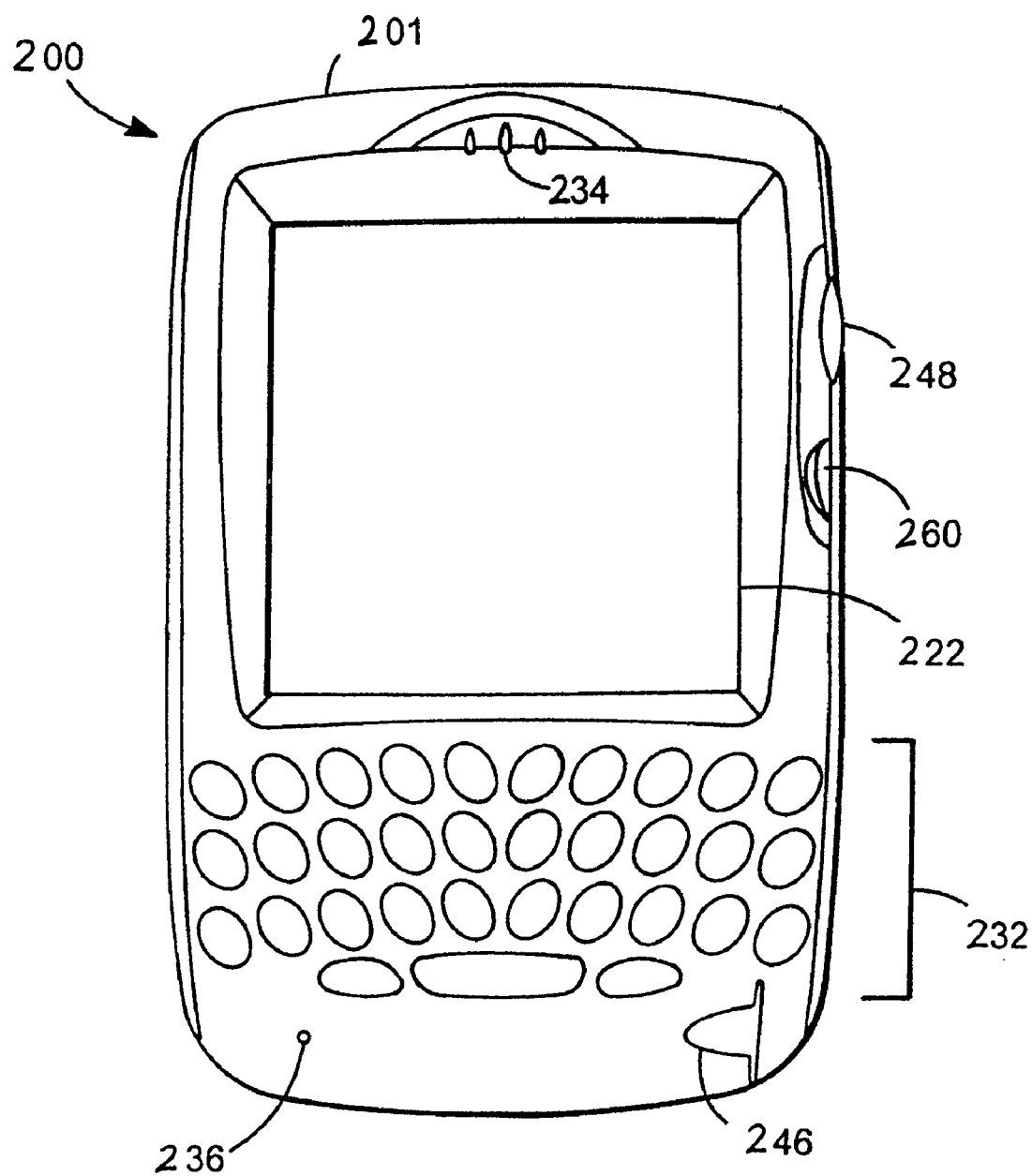
FIG. 2 is a front plan view of the handheld communications device depicted in FIG. 1.

Referring now to FIG. 2, there is shown a sample handheld communications device 200. Preferably, the handheld communications device 200 is a two-way wireless communications device having at least voice and data communication capabilities, and is configured to operate within a wireless cellular network. Further, preferably the handheld communications device 200 has the capability to communicate with other computer systems on the Internet. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

Figure 3:
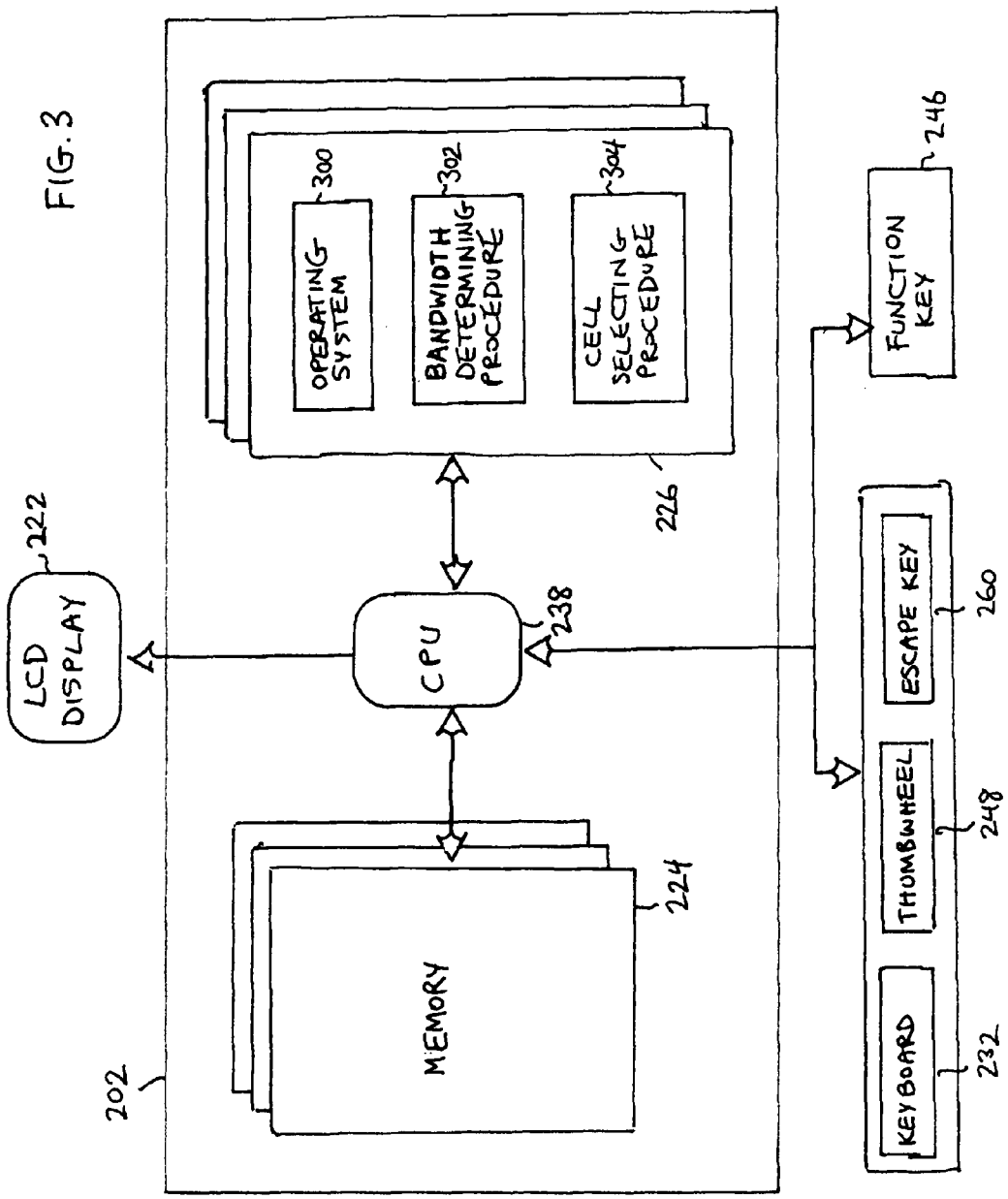
FIG. 3 is a schematic diagram depicting certain functional details of the data processing means of the handheld communications device, including the bandwidth determining procedure and the cell selecting procedure.

As shown, the handheld communications device 200 includes a display 222, a function key 246, and data processing means 202 (shown in FIG. 3) disposed within a common housing 201. The display 222 comprises a backlit LCD display. As shown in FIG. 3, the data processing means 202 is in communication with the display 222 and the function key 246. In one implementation, the backlit display 222 comprises a transmissive LCD display, and the function key 246 operates as a power on/off switch. Alternately, in another implementation, the backlit display 222 comprises a reflective or trans-reflective LCD display, and the function key 246 operates as a backlight switch.

In addition to the display 222 and the function key 246, the handheld communications device 200 includes user data input means for inputting data to the data processing means 202. As shown, preferably the user data input means includes a keyboard 232, a thumbwheel 248 and an escape key 260.

The data processing means 202 comprises a microprocessor 238, and a memory 224, 226 (disposed within the housing). The memory 224, 226 includes computer processing instructions which, when accessed from the memory 224, 226 and executed by the microprocessor 238, implement an operating system 300 that includes a bandwidth determining procedure 302 and a cell selecting procedure 304.

The function of the operating system 300, the bandwidth determining procedure 302 and the cell selecting procedure 304 will be discussed in greater detail below. However, it is sufficient at this point to note that the operating system 300 includes an Open Systems Interconnection (OSI) communication protocol stack that allows the handheld communications device 200 to send and receive communication signals over the wireless cellular network 219. The bandwidth determining procedure 302 and the cell selecting procedure 304 occupy the physical layer of the communication protocol stack, and together comprise a method that selects and re-selects radio system cells in the wireless cellular network 219 based on at least the capacity for data communication through each cell. It should also be understood that although the bandwidth determining procedure 302 and the cell selecting procedure 304 are preferably implemented as a set of computer processing instructions, these procedures may be implemented in electronics hardware instead.

Figure 4:
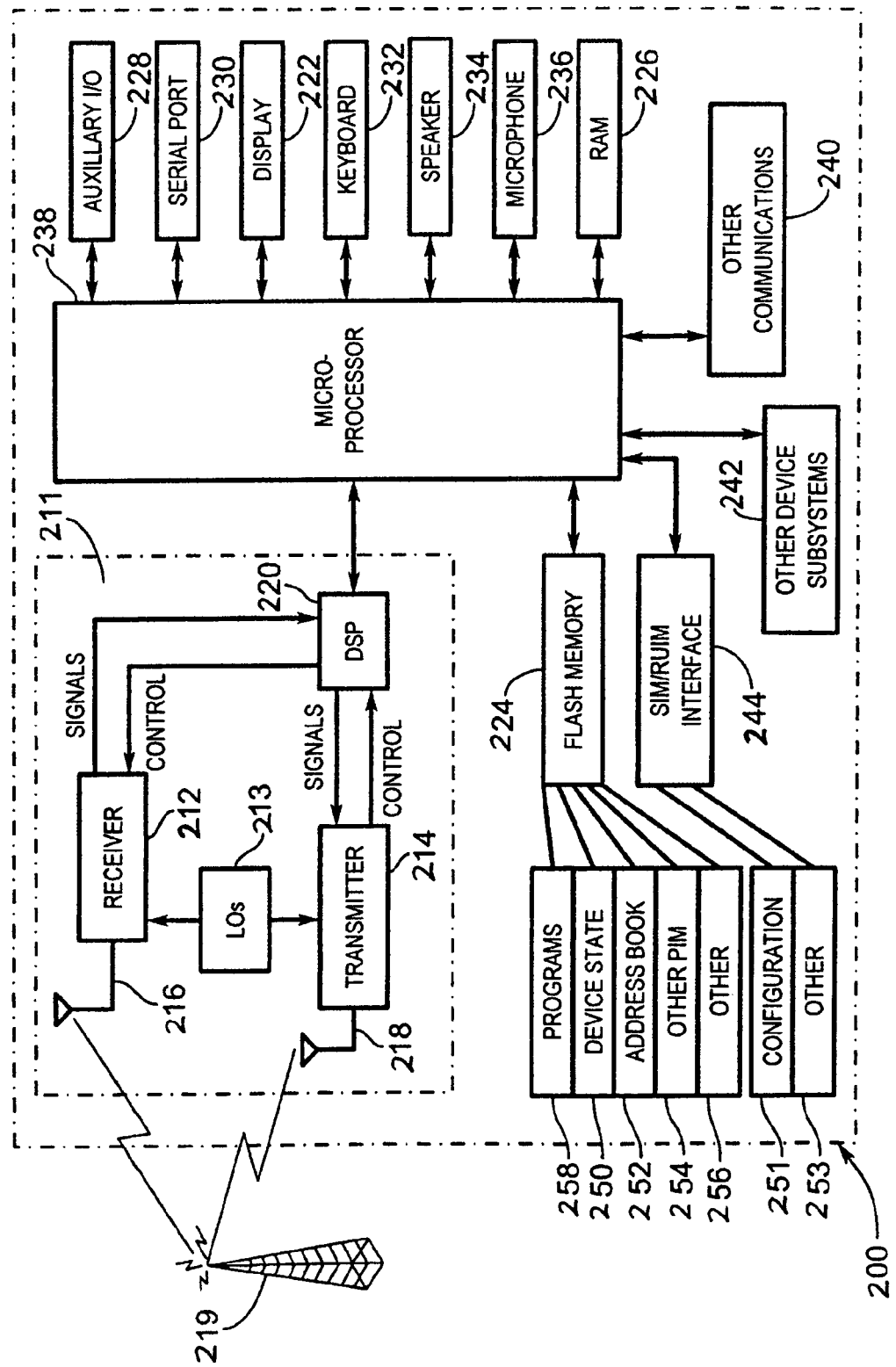
FIG. 4 is a schematic diagram depicting certain additional functional details of the handheld communications device.

FIG. 4 depicts functional details of the handheld communications device 200. As shown, the handheld communications device 200 incorporates a motherboard that includes a communication subsystem 211, the microprocessor 238, and a SIM/RUIM interface 244. The communication subsystem 211 performs communication functions, such as data and voice communications, and includes a receiver 212, a transmitter 214, and associated components such as one or more embedded or internal, antenna elements 216 and 218, local oscillators (LOs) 213, and a processing module such as a digital signal processor (DSP) 220. The communication subsystem 211 allows the handheld communications device 200 to send and receive communication signals over the wireless cellular network 219.

Signals received by antenna 216 through the wireless network 219 are input to the receiver 212, which performs common receiver functions such as frequency down conversion, and analog to digital (A/D) conversion, in preparation for more complex communication functions performed by the DSP 220. In a similar manner, signals to be transmitted are processed by DSP 220 and input to transmitter 214 for digital to analog conversion, frequency up conversion, and transmission over the wireless network 219 via antenna 218. The DSP 220 also measures the signal strength of wireless signals received (received signal strength) at the handheld communications device 200.

The SIM/RUIM interface 244 is similar to a card-slot into which a SIM/RUIM card can be inserted and ejected like a diskette or PCMCIA card. The SIM/RUIM card holds many key configuration 251, and other information 253 such as identification, and subscriber related information.

The microprocessor 238 controls the overall operation of the device, interacting with device subsystems such as the display 222, flash memory 224, random access memory (RAM) 226, auxiliary input/output (I/O) subsystems 228, serial port 230, keyboard 232, speaker 234, microphone 236, short-range communications subsystem 240, and device subsystems 242. As shown, the flash memory 224 includes both computer program storage 258 and program data storage 250, 252, 254 and 256.

Computer processing instructions are preferably also stored in the flash memory 224 or other similar non-volatile storage. Other computer processing instructions may also be loaded into a volatile memory such as RAM 226. The computer processing instructions, when accessed from the flash memory 224 and the RAM 226 and executed by the microprocessor 238 define computer programs, operating system specific applications, and the operating system 300, including the aforementioned bandwidth determining procedure 302 and cell selecting procedure 304. Such computer processing instructions may be installed onto the handheld communications device 200 upon manufacture, or may be loaded through the wireless network 219, the auxiliary I/O subsystem 228, the serial port 230, the short-range communications subsystem 240, or device subsystem 242.

In a data communication mode, a received text message or web page download will be processed by the communication subsystem 211 and output to the display 222, or alternatively to an auxiliary I/O device 228. A user of the handheld communications device 200 may compose data items such as email messages for example, using the keyboard 232. Such composed items may then be transmitted over the wireless network 219 through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

Figure 5:
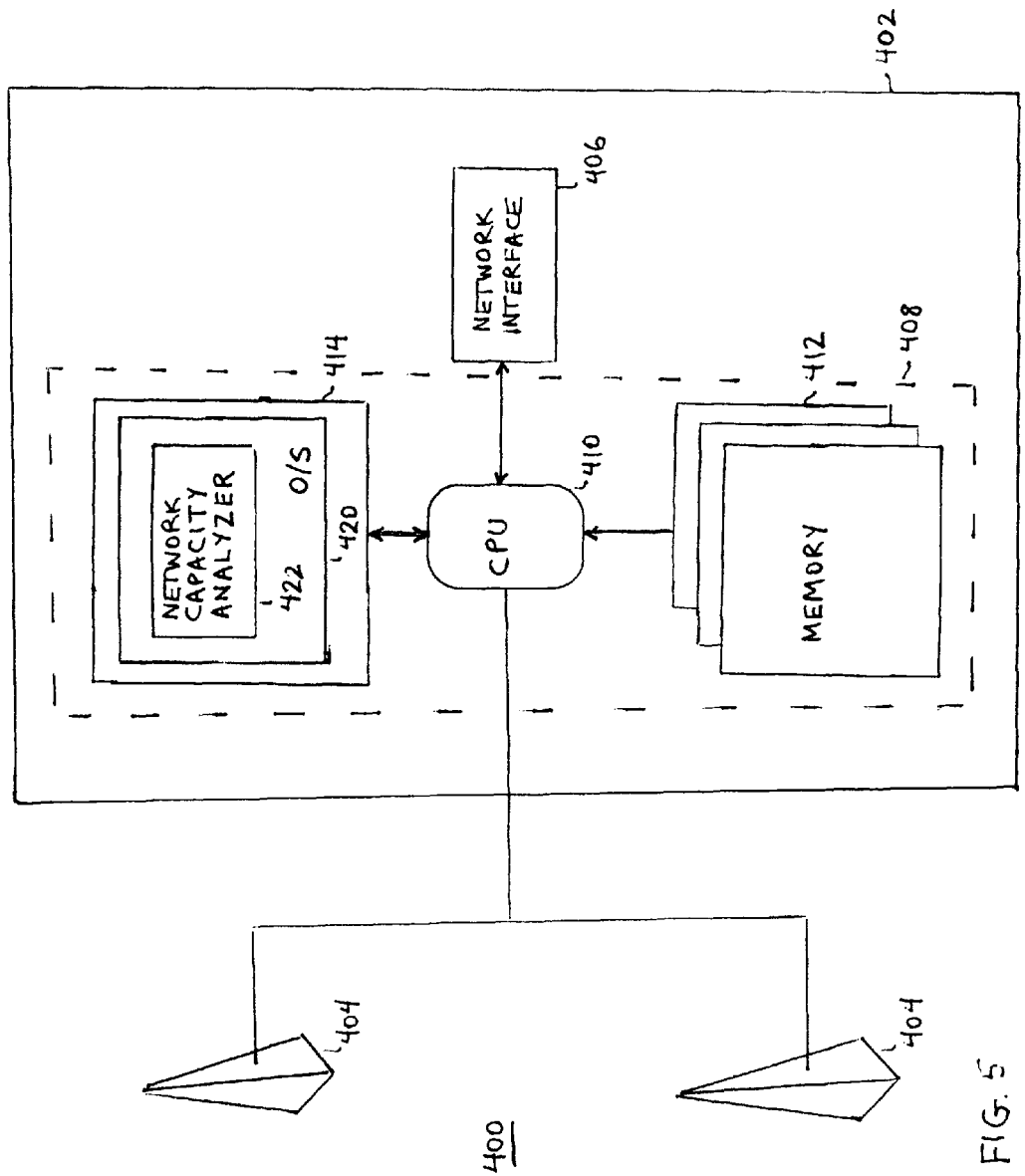
FIG. 5 is a schematic diagram depicting certain functional details of the base station subsystem depicted in FIG. 1.

FIG. 5 depicts functional details of the Base Station Subsystem (BSS) 400. As shown, each BSS 400 includes a Base Station Controller (BSC) 402 and a plurality of Base Transceiver Stations (BTSs) 404. The BTSs 404 implement radio link protocols with the handheld communications device 200. Each BTS 404 includes one or more radio transceivers, the coverage area of which comprises a radio system cell. Further, each BTS 404 is connected to the BSC 402 via a wired or optical link. Preferably, each BTS 404 communicates with the BSC 402 via a respective A-bis interface.

The BSC 402 acts as a physical connection between the handheld communications device 200 and the core network 500. As shown, the BSC 402 comprises a network interface 406 for interfacing the BSS 400 with the core network 500, and a data processing subsystem 408 coupled to the network interface 406 and the BTSs 404. The BSC 402 may also include a display terminal and a keyboard (not shown), coupled to the data processing subsystem 408, for monitoring and controlling the operation of the BSS 400.

The data processing subsystem 408 comprises a microprocessor 410, a non-volatile memory 412 and a volatile memory (RAM) 414. The non-volatile memory 412 includes computer processing instructions which, when copied into the RAM 414 by the microprocessor 410 and executed by the microprocessor 410, implement an operating system 420 that includes a network capacity analyzer 422. The operating system 420 implements radio-channel setup, frequency hopping and cell handovers between the BTSs 404 that are connected to the BSC 402.

As will be discussed in greater detail below, the network capacity analyzer 422 is configured to dynamically monitor the capacity of the segment of the wireless network 219 comprising the radio system cells that are serviced by the BTSs 404 which are connected to the BSC 402. Preferably, the network capacity analyzer 422 is also configured to dynamically monitor the capacity of the backhaul network (between the BSS 400 and the core network 500), and to receive data from the core network 500 indicative of the available capacity of the core network 500. The network capacity analyzer 422 is also configured to periodically generate from the wireless network, backhaul and core network capacity data, an indication of the available capacity for each radio system cell. It should also be understood that although the operating system 420 and the network capacity analyzer 422 are preferably implemented as a set of computer processing instructions, these components of the BSS 400 may be implemented in electronics hardware instead.

Figure 6:
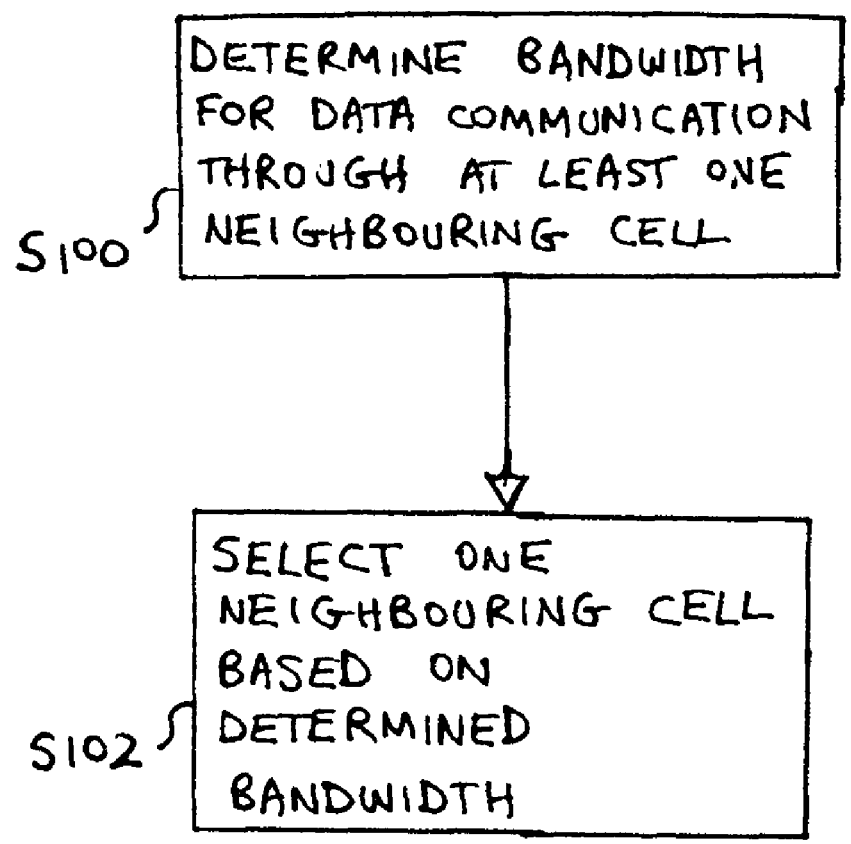
FIG. 6 is a flow chart depicting, by way of overview, the method performed by the handheld communications device when re-selecting radio system cells.
Figure 7A:
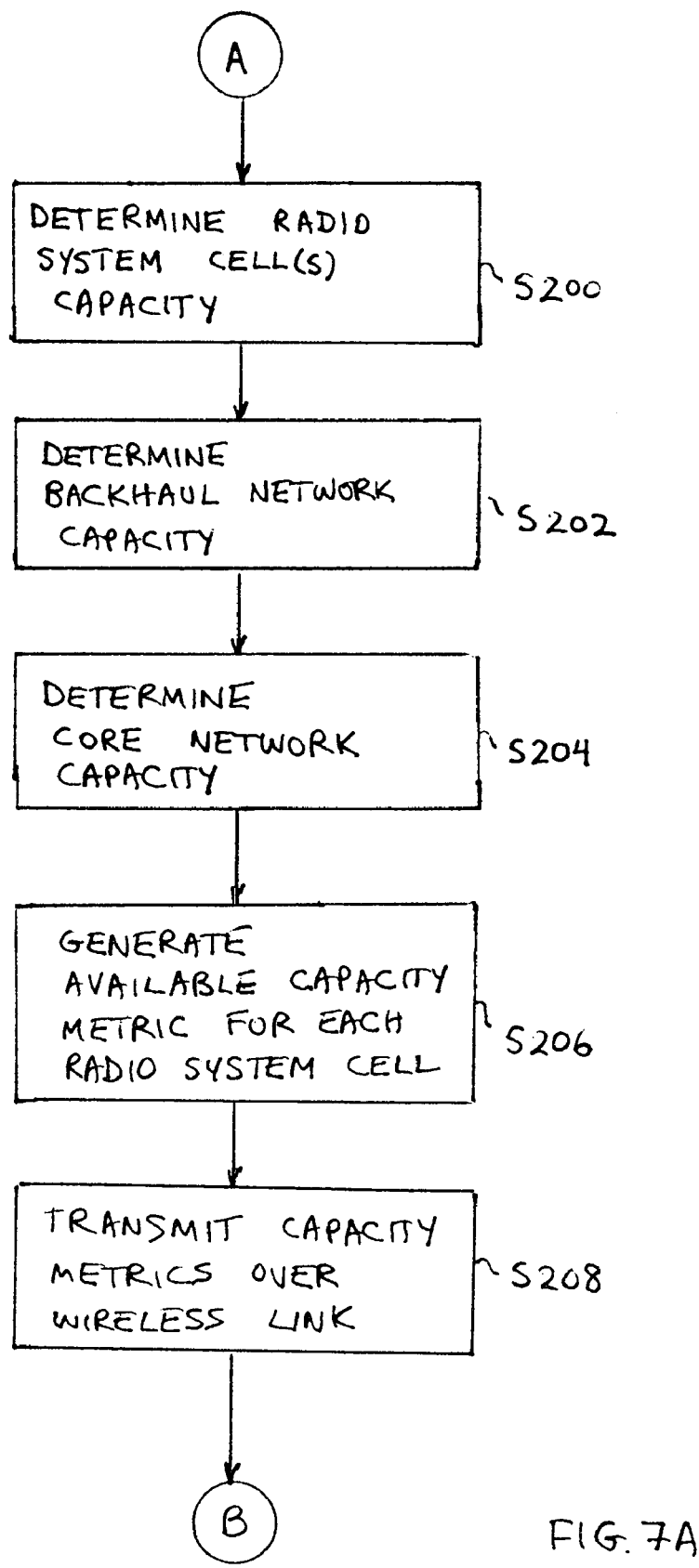
FIGS. 7a to 7d together comprise a flow chart depicting, in detail, the method performed by the handheld communications device when re-selecting radio system cells.
Figure 7B:
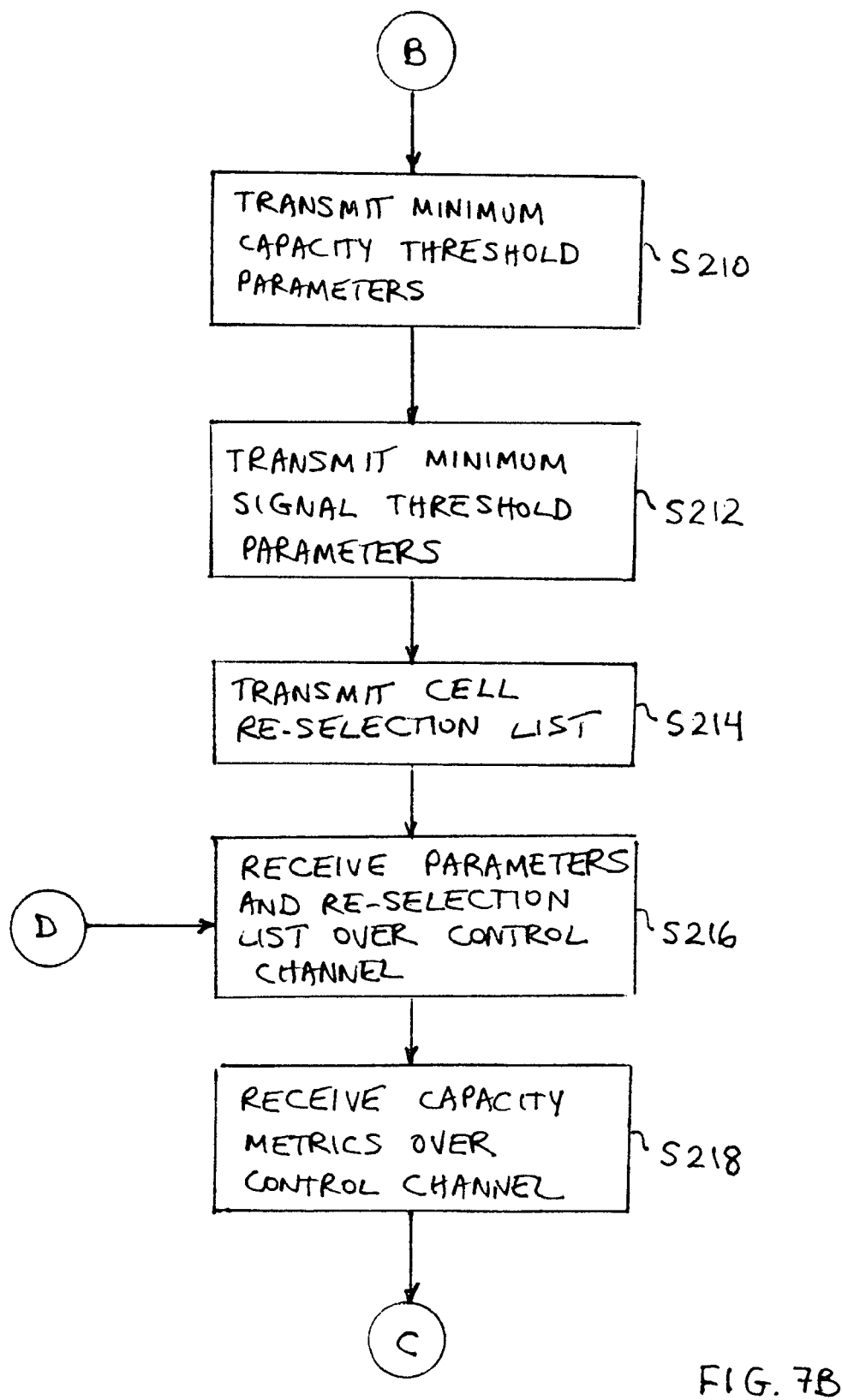
Figure 7C:
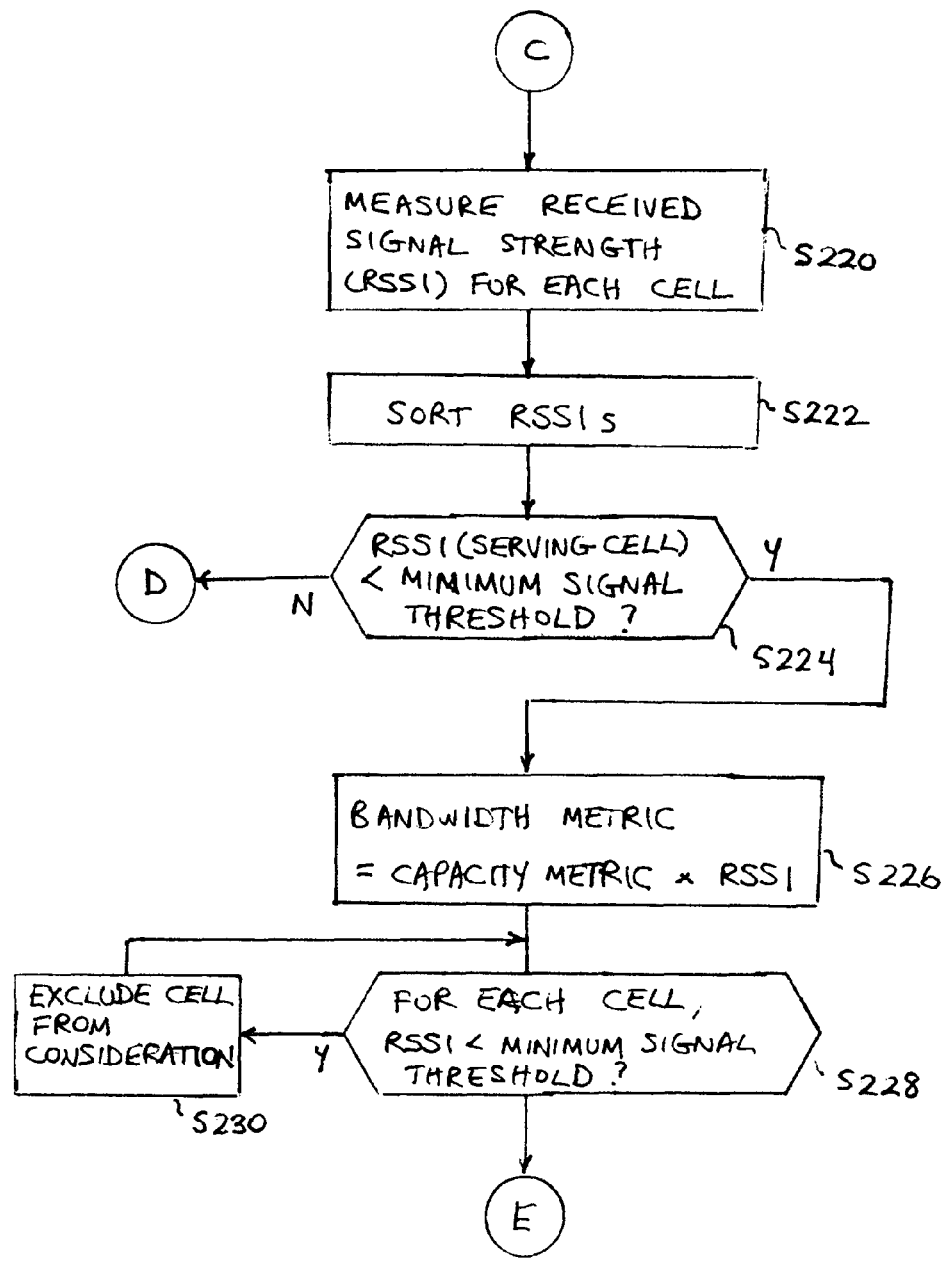
Figure 7D:
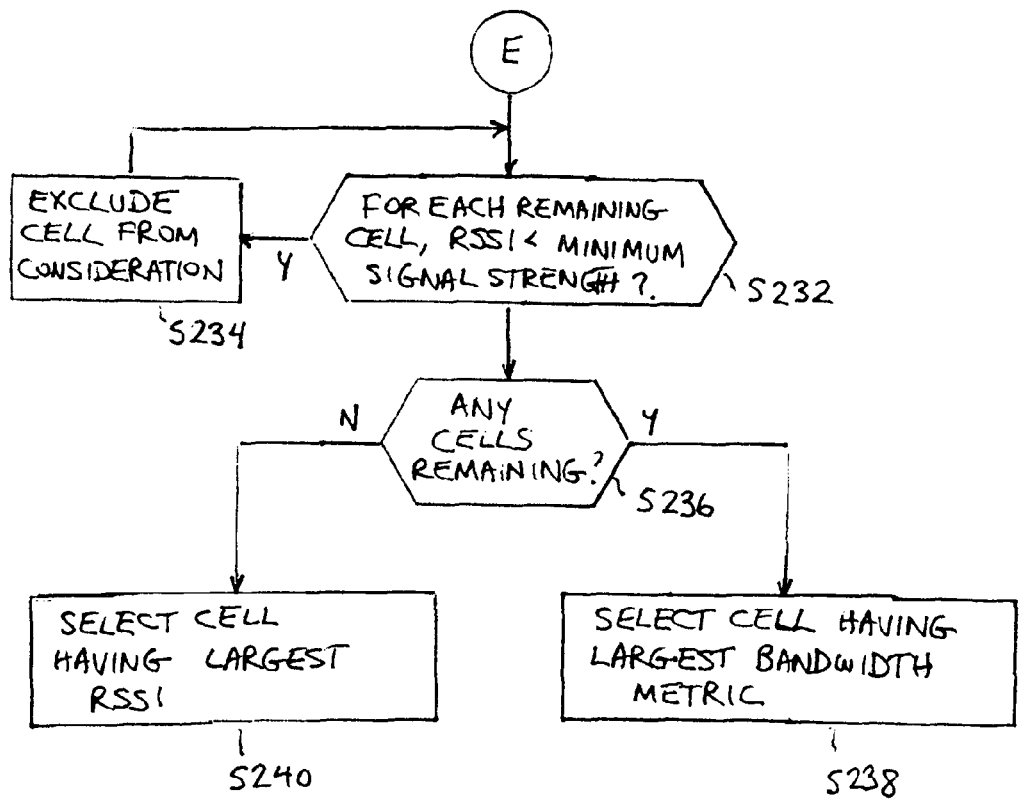

FIG. 6 is a flow chart that depicts, by way of overview, the sequence of steps performed by the handheld communications device 200 when re-selecting radio system cells in the wireless network 219. Initially, at step S100, the bandwidth determining procedure 302 of the handheld communications device 200 periodically and dynamically determines the bandwidth for data communication through at least one neighbouring cell to the serving cell. Then, at step S102, the cell selecting procedure 304 of the handheld communications device 200 selects one of the neighbouring cells for packet-based communication based on the bandwidth associated with each cell, as determined by the bandwidth determining procedure 302.

FIG. 7 is a flow chart that depicts, in detail, the sequence of steps performed by the handheld communications device 200 when re-selecting radio system cells in the wireless network 219. Initially, at step S200, the network capacity analyzer 422 determines the available capacity of each radio system cell that is serviced by a BTS 404 which is connected to the BSC 402. Each radio system cell capacity datum indicates the capacity available for communication over the wireless network 219 between the associated BTS 404 and the handheld communications device 200.

Typically, each BSS 400 maintains information concerning the available and remaining capacity for each radio system cell that is serviced by an associated BTSs 404. Accordingly, preferably the network capacity analyzer 422 computes the available capacity of each radio system cell based on the available and remaining capacity information received from the BSSs 400. In particular, preferably the network capacity analyzer 422 computes each available radio system cell capacity as a ratio of used radio system cell capacity to total radio system cell capacity.

The network capacity analyzer 422 then determines the available capacity of the backhaul network, at step S202. Alternately, at step S202, the network capacity analyzer 422 receives system information from the core network 500 indicating the capacity of the backhaul network. In this latter variation, preferably the core network 500 transmits the backhaul network capacity data over a control channel, such as a broadcast control channel or a dedicated control channel. Preferably, the network capacity analyzer 422 computes the available backhaul capacity as a ratio of used backhaul network capacity to total backhaul network capacity.

At step S204, the network capacity analyzer 422 receives system information from the core network 500 indicative of the available capacity of the core network 500. Where the core network 500 comprises a GPRS/EDGE network, preferably the network capacity analyzer 422 receives the core network capacity data from the SGSN 502 of the core network 500. Preferably, the core network 500 transmits the core network capacity data over a control channel, such as a broadcast control channel or a dedicated control channel. Further, preferably the network capacity analyzer 422 computes the available core network capacity as a ratio of used core network capacity to total core network capacity.

It should be understood that the network capacity analyzer 422 need not receive the foregoing available capacity data (radio system cell capacity data, backhaul network capacity data, and core network capacity data) in the sequence specified above. For instance, in situations where the radio system cell capacity is more volatile than the backhaul network capacity and the core network capacity, the network capacity analyzer 422 could receive the backhaul network capacity data and the core network capacity data at lower periodic rate than the radio system cell capacity data.

At step S206, the network capacity analyzer 422 generates, from the available capacity data a metric for the available capacity for each radio system cell. Preferably, the network capacity analyzer 422 calculates the capacity metric for each cell by multiplying together the radio system cell capacity data for the cell, the backhaul network capacity data, and the core network capacity data, resulting in a value between 0 and 1. However, other calculation schemes are possible and are encompassed by the invention.

Further, although it is preferred that the network capacity analyzer 422 generates the capacity metric from the wireless network capacity data, the backhaul network capacity data, and the core network capacity data, this step is not an essential step of the procedure. Rather, the network capacity analyzer 422 could generate the capacity metric from only one or two or these parameters, or additional capacity parameters.

For instance, in one variation, the network capacity analyzer 422 does not determine available wireless network capacity, in which case the cell capacity metric will only reveal differences in the available backhaul network capacity and core network capacity. In other variation, the network capacity analyzer 422 generates the capacity metric only from the wireless network capacity data. This latter variation may be employed, for instance, where computational power of the network capacity analyzer 422 is limited, and the major capacity limitation is in the wireless network 219 as opposed to the backhaul network or the core network 500.

At step S208, the network capacity analyzer 422 transmits to the BTSs 404 the capacity metrics for all the radio system cells that are serviced by the BTSs 404 connected to the BSC 402. As a result, each BTS 404 receives the capacity metric for the radio system cell that the BTS 404 is serving, together with the capacity metrics for the neighbouring radio system cells. Where the communications network 100 is a GSM network, preferably the network capacity analyzer 422 transmits to each BTS 404 the capacity metric for the radio system cell that the BTS 404 is serving, together with the capacity metrics for the six (6) neighbouring radio system cells in the PLMN.

Each BTS 404 then transmits the capacity metrics over the wireless network 219 via a control channel. Where the communications network 100 is a GSM network, preferably each BTS 404 transmits each capacity metric as a 4-bit quantity over transmits the core network capacity data over a broadcast control channel or a dedicated control channel. However, the invention is not limited to the aforementioned granularity level and communication channel.

At step S210, preferably the network capacity analyzer 422 transmits a MINIMUM CAPACITY THRESHOLD parameter to each BTS 404 that is connected to the BSC 402. The MINIMUM CAPACITY THRESHOLD parameter is optional, and indicates the minimum capacity that the associated radio system cell must possess to be considered for cell selection and re-selection. As a result, each BTS 404 receives the MINIMUM CAPACITY THRESHOLD parameter for the radio system cell that the BTS 404 is serving, together with the MINIMUM CAPACITY THRESHOLD parameters for the neighbouring radio system cells. As will be explained below, this parameter prevents the handheld communications device 200 from placing excessive importance on a cell's received signal strength during the cell selection and re-selection process.

Each BTS 404 transmits the MINIMUM CAPACITY THRESHOLD parameters over the wireless network 219 via a control channel. Where the communications network 100 is a GSM network, preferably each BTS 404 transmits the MINIMUM CAPACITY THRESHOLD parameters as a system information message over a broadcast control channel (such as PBCCH) or a dedicated control channel.

At step S212, preferably the BSC 402 transmits a MINIMUM SIGNAL THRESHOLD parameter to each BTS 404 that is connected to the BSC 402. The MINIMUM SIGNAL THRESHOLD parameter is optional, and indicates the minimum received signal strength that the associated radio system cell must possess to be considered for cell selection and re-selection. As a result, each BTS 404 receives the MINIMUM SIGNAL THRESHOLD parameter for the radio system cell that the BTS 404 is serving, together with the MINIMUM SIGNAL THRESHOLD parameters for the neighbouring radio system cells. As will be explained below, this parameter prevents the handheld communications device 200 from placing excessive importance on a cell's capacity during the cell selection and re-selection process. As a consequence, the handheld communications device 200 can be directed to select a cell having a more robust, but possibly slower modulation and encoding scheme.

Each BTS 404 transmits the MINIMUM SIGNAL THRESHOLD parameters over the wireless network 219 via a control channel. Where the communications network 100 is a GSM network, preferably each BTS 404 transmits the MINIMUM SIGNAL THRESHOLD parameters over a broadcast control channel (such as PBCCH) or a dedicated control channel.

At step S214, preferably the BSC 402 transmits to the BTSs 404 that are connected to the BSC 402 a list of cells for the handheld communications device 200 to monitor during cell re-selection. This list will typically includes the RF carrier frequencies of the serving cell and a number of the neighbouring cells of the serving cell. Each BTS 404 transmits the cell re-selection list over a control channel of the wireless network 219. Where the communications network 100 is a GSM network, preferably each BTS 404 broadcasts the cell re-selection list as a BA(GPRS) cell list over the PBCCH channel of the serving cell.

It should be understood that the BSC 402 need not transmit the capacity metrics, the MINIMUM CAPACITY THRESHOLD parameters, the MINIMUM SIGNAL THRESHOLD parameters and the cell re-selection list to the BTSs 404 in the sequence specified above. Rather, the BSC 402 could transmit the foregoing data to the BTSs 404 in a different order, or concurrently as part of a common meta-frame.

Similarly, the BTSs 404 need not transmit the capacity metrics, the MINIMUM CAPACITY THRESHOLD parameters, the MINIMUM SIGNAL THRESHOLD parameters and the cell re-selection list over the wireless network 219 in the sequence specified above. For instance, the BTSs 404 could transmit the MINIMUM CAPACITY THRESHOLD parameters, the MINIMUM SIGNAL THRESHOLD parameters and the cell re-selection list over the wireless network 219 whenever a handheld communications device 200 registers with the communications network 100, and then periodically transmit the capacity metrics at a rate dictated by the system administrator based on prior variations in cell capacity.

At step S216, the handheld communications device 200 receives the MINIMUM CAPACITY THRESHOLD parameters (if transmitted), the MINIMUM SIGNAL THRESHOLD parameters (if transmitted) and the cell re-selection list over the control channel of the serving cell of the wireless network 219. As discussed above, where the communications network 100 is a GSM network preferably the handheld communications device 200 receives the MINIMUM CAPACITY THRESHOLD parameters, the MINIMUM SIGNAL THRESHOLD parameters and the cell re-selection list over the PBCCH channel of the serving cell.

At step S218, the handheld communications device 200 receives the capacity metrics for the serving cell and each neighbouring cell, over the control channel of the serving cell of the wireless network 219. Where the communications network 100 is a GSM network, preferably the bandwidth determining procedure 302 receives the capacity metrics for the serving cell and six (6) neighbouring cells over a broadcast control channel (such as PBCCH) or a dedicated control channel.

As discussed above, the handheld communications device 200 need not receive the MINIMUM CAPACITY THRESHOLD parameters, the MINIMUM SIGNAL THRESHOLD parameters, the cell re-selection list and the capacity metrics in the sequence specified above. For instance, the handheld communications device 200 could receive the MINIMUM CAPACITY THRESHOLD parameters, the MINIMUM SIGNAL THRESHOLD parameters and the cell re-selection list when the handheld communications device 200 registers with the PLMN, and then thereafter periodically receive the capacity metrics.

At step S220, the handheld communications device 200 measures the received signal strength for the serving cell and for the neighbouring cells specified in the cell re-selection list, and calculates an indication of the average received signal strength (RSSI) for each cell. Where the communications network 100 is a GSM network, preferably the handheld communications device 200 continuously monitors the received signal strength of the BCCH carrier of the serving cell and the signal strength of all of the non-serving BCCH carriers indicated in the BA(GPRS) list. The handheld communications device 200 then computes a running average RLA_P of the received signal strength for each cell in the BA(GPRS) list, in accordance with 3GPP TS 45.008, clauses 10.1.1.1 and 10.1.1.2.

At step S222, preferably the handheld communications device 200 sorts the neighbouring cells specified in the cell re-selection list (the "sorted cell re-selection list") according to descending RSSI magnitude. Where the communications network 100 is a GSM network, preferably the handheld communications device 200 uses the RLA_P values to maintain a list of the six (6) strongest non-serving BCCH carriers, sorted by descending average signal strength. Sorting at this stage is preferred since, as will be explained below with respect to step S240, the handheld communications device 200 resorts to conventional cell re-selection if all of the neighbouring cells in the list of the six (6) strongest non-serving BCCH carriers were excluded from initial consideration at steps S230 and S234.

At step S224, the handheld communications device 200 compares the RSSI for the serving cell against the MINIMUM SIGNAL THRESHOLD for the serving cell. If the RSSI for the serving cell is greater than or equal to the MINIMUM SIGNAL THRESHOLD, the handheld communications device 200 does not initiate cell re-selection. Instead, the handheld communications device 200 continues to camp on the serving cell, recursively performing steps S216 to S224. However, if the RSSI for the serving cell is less than the MINIMUM SIGNAL THRESHOLD, the bandwidth determining procedure 302 of the handheld communications device 200 initiates cell re-selection, at step S226.

Where the communications network 100 is a GSM network, at step S224 preferably the handheld communications device 200 determines whether the path loss criterion C1<0. If C1>=0, the handheld communications device 200 does not initiate cell re-selection. Instead, the handheld communications device 200 continues to camp on the serving cell, recursively performing steps S216 to S224. However, if C1<0, the bandwidth determining procedure 302 of the handheld communications device 200 initiates cell re-selection, at step S226.

As described in 3GPP TS 45.008, clause 10.1.2:

$$C1 = A - \text{MAX}(B, 0)$$

where:
A=RLA_P−GPRS_RXLEV_ACCESS_MIN
B=GPRS_MS_TXPWR_MAX_CCH−P
P=maximum output power of handheld communications device 200
RXLEV_ACCESS_MIN=minimal received signal level required at the handheld communications device 200 for access to network
GPRS_MS_TXPWR_MAX_CCH=maximum power handheld communications device 200 can use when accessing network Therefore, if maximum permitted power output is less than the maximum output power of the handheld communications device 200, the handheld communications device 200 initiates cell re-selection at step S226 if the average received signal level RLA_P for the serving cell is less than the minimum signal level required at the handheld communications device 200 for access to the communications network 100.

At step S226, the bandwidth determining procedure 302 of the handheld communications device 200 initiates cell re-selection by calculating, for each neighbouring cell specified in the cell re-selection list, a bandwidth metric of the available bandwidth for data communication through each neighbouring cell. Preferably, the bandwidth determining procedure 302 calculates the bandwidth metric for each neighbouring radio system cell by multiplying together the capacity metric and the RSSI for the cell.

The bandwidth metrics, however, need not be determined based on the both the capacity metrics and the RSSIs. For instance, where the RSSI does not vary appreciably (e.g. the area occupied by the cell is small), the bandwidth determining procedure 302 may calculate the bandwidth metric only from the capacity metric. In this variation, the bandwidth determining procedure 302 could set the bandwidth metric associated with each cell equal to the capacity metric for the cell. In another variation, the RSSI for some radio system cells might vary, while the RSSI for other cells might remain substantially constant. In this latter variation, for those cells whose RSSI varies, the bandwidth determining procedure 302 might calculate the bandwidth metrics by multiplying together the capacity metric and the RSSI for each cell. However, for the other cells whose RSSI remains substantially constant, the bandwidth determining procedure 302 might calculate the bandwidth metrics by simply scaling the capacity metric for each cell.

At step S228, the cell selecting procedure 304 of the handheld communications device 200 begins to search for the best suitable neighbouring cell from the sorted cell re-selection list. To do so, optionally the cell selecting procedure 304 compares the RSSI of the neighbouring cell having the strongest RSSI against the MINIMUM SIGNAL THRESHOLD (if transmitted) for the cell. Where the communications network 100 is a GSM network, the cell selecting procedure 304 scans the list of cells having the six (6) strongest non-serving BCCH carriers, selects the cell having the largest RLA_P, and then compares the RLA_P against the MINIMUM SIGNAL THRESHOLD (if transmitted) for the cell.

If the RSSI for the cell is less than the associated MINIMUM SIGNAL THRESHOLD, the cell selecting procedure 304 excludes the cell from initial consideration as a suitable cell at step S230, and considers the RSSI of the neighbouring cell having the next strongest RSSI. The cell selecting procedure 304 repeats steps S228 to S230 until it has considered the RSSI of all the neighbouring cells in the sorted cell re-selection list.

At step S232, the cell selecting procedure 304 begins to search for the best suitable cell from the cells remaining in the sorted cell re-selection list. To do so, the cell selecting procedure 304 optionally compares the capacity metric of the neighbouring cell having the strongest RSSI against the MINIMUM CAPACITY THRESHOLD (if transmitted) for the cell.

If the capacity metric for the cell is less than the associated MINIMUM CAPACITY THRESHOLD, the cell selecting procedure 304 excludes the cell from initial consideration as a suitable cell at step S234, and considers the capacity metric of the remaining neighbouring cell having the next strongest RSSI. The cell selecting procedure 304 repeats steps S232 to S234 until it has considered the capacity metric of all the remaining neighbouring cells in the sorted cell re-selection list.

At step S236, the cell selecting procedure 304 reviews the list of neighbouring cells that were not excluded from initial consideration at steps S230 and S234. If at least one neighbouring cell was not excluded from consideration, at step S238 the cell selecting procedure 304 selects the neighbouring cell having the largest bandwidth metric. The handheld communications device 200 then camps on the neighbouring cell selected by the cell selecting procedure 304.

However, if all of the neighbouring cells in the list of the six (6) strongest non-serving BCCH carriers were excluded from initial consideration at steps S230 and S234, at step S240 the handheld communications device 200 does not consider cell capacity when making a cell re-selection determination. Instead, from the sorted cell re-selection list, the handheld communications device 200 selects the cell having the highest RSSI. Where the communications network 100 is a GSM network, at step S240 preferably the handheld communications device 200 calculates C32 for each non-serving cell specified in the BA(GPRS) list, and selects the cell having the highest C32 value, as described in 3GPP TS 45.008, clause 10.1.3. The handheld communications device 200 then camps on the selected cell until cell re-selection is triggered again at step S224.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

The invention claimed is:
1. A method of cell selection in a wireless mobile communication station operable in a wireless cellular network having a plurality of radio system cells, the method comprising:
at the mobile communication station:
receiving from the network, a capacity measure of at least one of a backhaul capacity or a core network capacity associated with each of a serving one of the plurality of radio system cells and at least one neighboring cell to the serving cell, for each of the cells, the capacity measure comprising a product of the at least one of the backhaul capacity or the core network capacity with a capacity of a wireless link between the mobile station and a base station serving the respective cell, and generating a bandwidth metric of available bandwidth for data communication through the at least one neighboring cell based on the capacity measure for the at least one neighboring cell; and selecting one of the cells for packet-based communication based on the bandwidth metric.

2. The method according to claim 1, wherein the plurality of radio system cells includes radio system cells of one or more radio access technologies.

3. The method according to claim 2, wherein the bandwidth metric is generated from a signal strength measurement and the respective capacity measure for the at least one neighboring cell, and the selecting of the one of the cells comprises choosing the one of the cells based on the capacity measures and the signal strength measurements.

4. The method according to claim 3, wherein generating the bandwidth metric comprises calculating for the at least one neighboring cell, a product of the capacity measure and the signal strength measurement for the associated cell, and the choosing of the one of the cells based on the capacity measures and the signal strength measurements comprises selecting the one of the cells having a maximum one of the calculated products.

5. The method according to claim 1, wherein the capacity measure comprises, for each of the cells, a product of the capacity of the wireless link, the backhaul capacity and the core network capacity.

6. The method according to claim 5, wherein the mobile station receives the capacity measures over a control channel of the wireless network.

7. A wireless mobile communication station configured for communication within a wireless cellular network having a plurality of radio system cells, the mobile station comprising:
bandwidth determining means for:
receiving from the network, a capacity measure of at least one of a backhaul capacity or a core network capacity associated with each of a serving one of the plurality of radio system cells and at least one neighboring cell to the serving cell, for each of the cells, the capacity measure comprising a product of the at least one of the backhaul capacity or the core network capacity with a capacity of a wireless link between the mobile station and a base station serving the respective cell, and
generating a bandwidth metric of available bandwidth for data communication through the at least one neighboring cell based on the capacity measure for the at least one neighboring cell; and
cell selecting means in communication with the bandwidth determining means for selecting one of the cells for packet-based communication based on the bandwidth metric.

8. The mobile station according to claim 7, wherein the plurality of radio system cells includes radio system cells of one or more radio access technologies.

9. The mobile station according to claim 8, wherein the bandwidth metric is generated from a signal strength measurement and the respective capacity measure for the at least one neighboring cell, the mobile station includes measuring means for measuring the signal strength for each of the cells, and the cell selecting means is configured to choose the one of the cells based on the capacity measures and the signal strength measurements.

10. The mobile station according to claim 9, wherein the bandwidth determining means is configured to calculate for each of the cells a product of the capacity measure and the signal strength measurement for the associated cell, and the cell selecting means is configured to choose the one of the cells by selecting the cell having a maximum one of the calculated products.

11. The mobile station according to claim 7, wherein the capacity measure comprises a product of the capacity of the wireless link, the backhaul capacity and the core network capacity.

12. The mobile station according to claim 7, wherein the mobile station receives the capacity measures over a control channel of the wireless network.

13. A non-transitory computer-readable medium carrying processing instructions for a mobile station, the processing instructions when executed by computer processing means of the mobile station causing the mobile station to perform the method according to claim 1.

14. A base station subsystem for directing cell reselection within a wireless cellular network having a plurality of radio system cells, the base station subsystem comprising:
a radio transceiver configured to provide a wireless link with a mobile station camped on one of a plurality of neighboring radio system cells;
a network interface configured to interface the base station subsystem with a core network of the cellular network; and
a network capacity analyzer coupled to the radio transceiver and the network interface, the network capacity analyzer being configured to:
receive a capacity measure of at least one of the core network or a backhaul between the base station subsystem and the core network,
generate at least one capacity metric indicative of capacity for data communication through at least one neighboring radio system cell comprising a product of the capacity measure and a capacity of the wireless link, and
initiate transmission of the at least one capacity metric to the mobile station.

15. The base station subsystem according to claim 14, wherein the plurality of radio system cells includes radio system cells of one or more radio access technologies.

16. The base station subsystem according to claim 14, wherein the network capacity analyzer is configured to generate the at least one capacity metric for the at least one neighboring radio system cell based on a product of the backhaul capacity and the core network capacity.

17. A method of directed cell selection in a wireless cellular network having a plurality of radio system cells, the cellular network comprising a base station subsystem, the base station subsystem including a base station serving each of the radio system cells, the method comprising:
the base station subsystem receiving a capacity measure of at least one of a core network or a backhaul associated with each of the radio system cells, and from the capacity measure, generating at least one capacity metric indicative of capacity for data communication through at least one of a plurality of neighboring radio system cells, the capacity metric comprising a product of the capacity measure and a capacity of a wireless link between the mobile station and the base station serving the at least one of the neighboring cells; and
one of the base stations transmitting to at least one mobile station camped on one of the radio system cells served by the one base station, the at least one capacity metric for the at least one of the neighboring cells, the at least one mobile station being configured to receive the at least one capacity metric and to select one of the neighboring cells for packet-based communication in accordance with the at least one capacity metric.

18. The method of claim 17, wherein the plurality of radio system cells includes radio system cells of one or more radio access technologies.

19. The method according to claim 18, wherein the mobile station selects the at least one of the neighboring cells based on the at least one capacity metric and signal strength measurement for the at least one of the neighboring cells.

20. The method according to claim 19, wherein the mobile station calculates a product of the at least one capacity metric and the signal strength measurement for the at least one of the neighboring cells, and selects the at least one of the neighboring cells based on the product being a maximum product relative to products calculated for others of the neighboring cells.

21. The method according to claim 17, wherein the capacity metric comprises a product of the capacity of the wireless link, the backhaul capacity and the core network capacity.

22. The method according to claim 21, wherein the one of the base stations transmits the capacity metric over a control channel of the wireless network.

23. A non-transitory computer-readable medium carrying processing instructions for a base station subsystem operating in a wireless cellular network, the processing instructions, when executed by computer processing means of the base station subsystem, causing the base station subsystem to perform the method according to claim 17.

* * * * *